United States Patent [19]

Micheletti

[11] Patent Number: 4,750,468
[45] Date of Patent: Jun. 14, 1988

[54] MACHINE FOR CUTTING BLOCKS OF STONES IN QUARRY

[76] Inventor: Bruno Micheletti, Via del Bravo 12 - Zona Industriale, 54031 Avenza (Carrara), Italy

[21] Appl. No.: 814,624

[22] Filed: Dec. 30, 1985

[30] Foreign Application Priority Data

Jan. 9, 1985 [IT] Italy .............................. 20441/85[U]

[51] Int. Cl.⁴ .............................................. B28D 1/08
[52] U.S. Cl. ..................................... 125/21; 51/148; 474/109
[58] Field of Search ...................... 125/12, 21; 51/148; 474/109

[56] References Cited

U.S. PATENT DOCUMENTS

| | | | |
|---|---|---|---|
| 594,542 | 11/1897 | Knobel | 125/21 |
| 2,507,372 | 5/1950 | Emmons | 51/148 |
| 2,674,238 | 4/1954 | Dessureau et al. | 125/21 |
| 2,795,222 | 6/1957 | Garrison | 125/21 |
| 4,284,192 | 8/1981 | Taylor | 474/109 |
| 4,478,595 | 10/1984 | Hayakawa et al. | 474/109 |

*Primary Examiner*—Harold D. Whitehead
*Attorney, Agent, or Firm*—Ladas & Parry

[57] ABSTRACT

The invention relates to a machine for cutting blocks of stone with a diamond wire. Electronic devices detect the diamond wire tension as a function of the power absorbed by the motor and driving it correspondingly control the withdrawal of the machine, as the cutting operation goes ahead, with a view to keeping said tension constant.

4 Claims, 2 Drawing Sheets

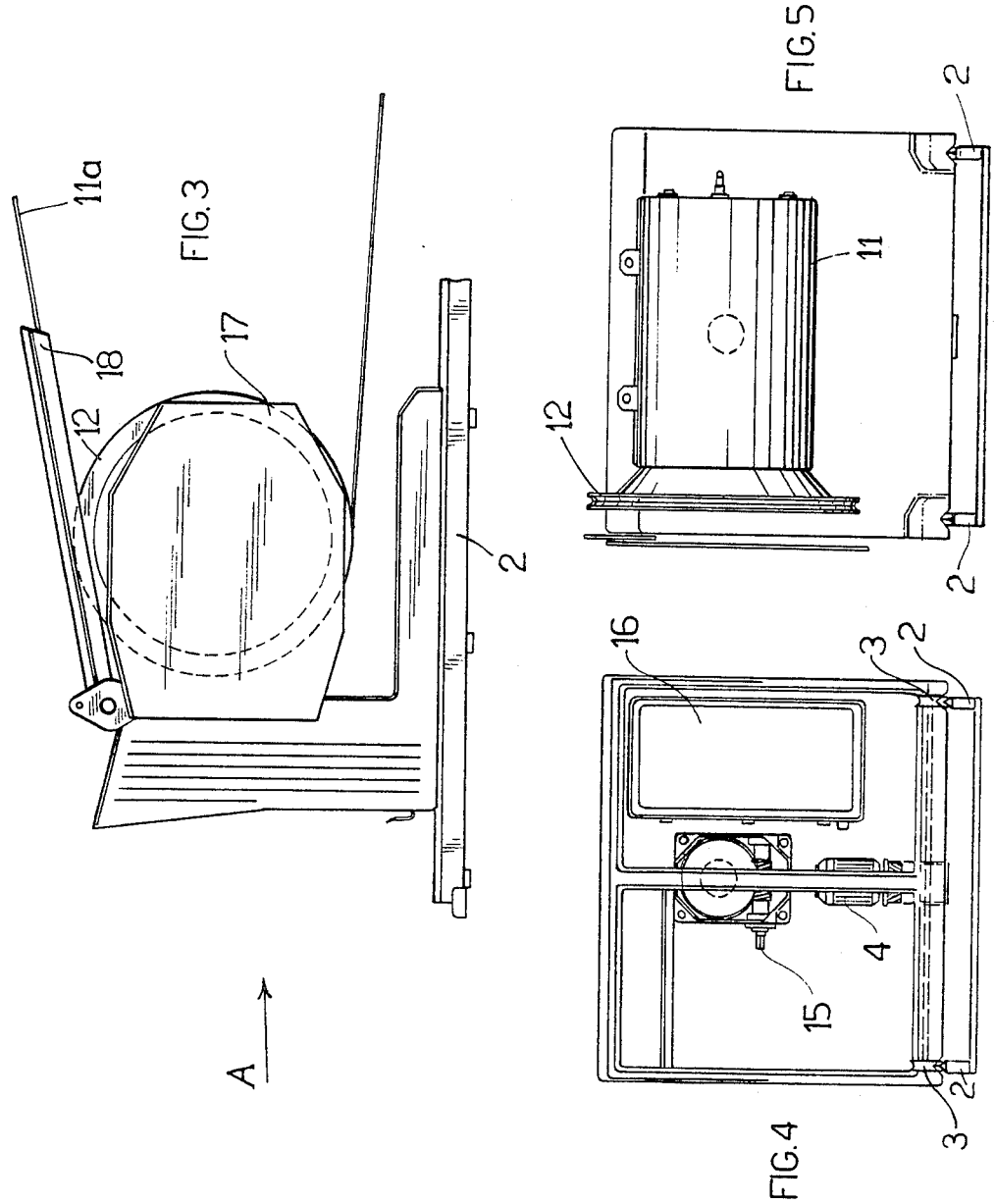

MACHINE FOR CUTTING BLOCKS OF STONES IN QUARRY

The present invention relates to a machine for cutting a block of stone in a quarry of the diamond wire tool type. More particularly, the machine according to the invention is characterized by devices which eliminate the counterweight heretofore used in this type of machine thus to obtain a more compact unit of constant and regular working. The introduction to the market, in recent years, of a new tool for cutting stones in quarry, consisting of a wire to which a plurality of beads of abrasive material are fixed—said tool being commonly called "diamond wire tool"—has led to the development of specific machines that have replaced, gradually, the prior fixed machines wherein a common helical steel wire was used.

The machines using diamond wire tool are formed substantially by a frame on which there is mounted a motor driving a pulley dragging the wire and that may be placed according to the necessary angle.

To keep the tension of the diamond wire tool constant, these machines are generally mounted on tracks and connected to a counterweight, at a some meters' distance, for withdrawing the machine as the cutting operation proceeds.

Obviously, if we want to avoid interrupting the work frequently to position the counterweight at the end of its run, it is necessary to use, for said counterweight, structures high enough and placed at an opportune distance from the machine, with the consequent taking up of a remarkable room and the relevant troubles resulting therefrom.

In order to prevent the above mentioned inconveniences, the present invention discloses a machine for cutting a block of stone in a quarry. The machine has devices which control its withdrawal to keep the tension of the diamond wire tool constant without using counterweights or other cumbersome apparatuse.

In particular, electronic devices detect the tension of the wire as a function of the power absorption of the motor driving the wire by a main pulley and correspondingly control the withdrawal of the machine by a secondary motor.

The present invention will be now described in detail, with particular reference to the enclosed figures, in which:

FIG. 3 shows the side view of the machine according to the invention, from the side opposite to the one of FIG. 1;

FIG. 4 shows the view of the machine according to arrow A of FIG. 3, with the inner parts in evidence;

FIG. 5 shows the view of the machine from the side opposite to the one of FIG. 4.

Figure 1:
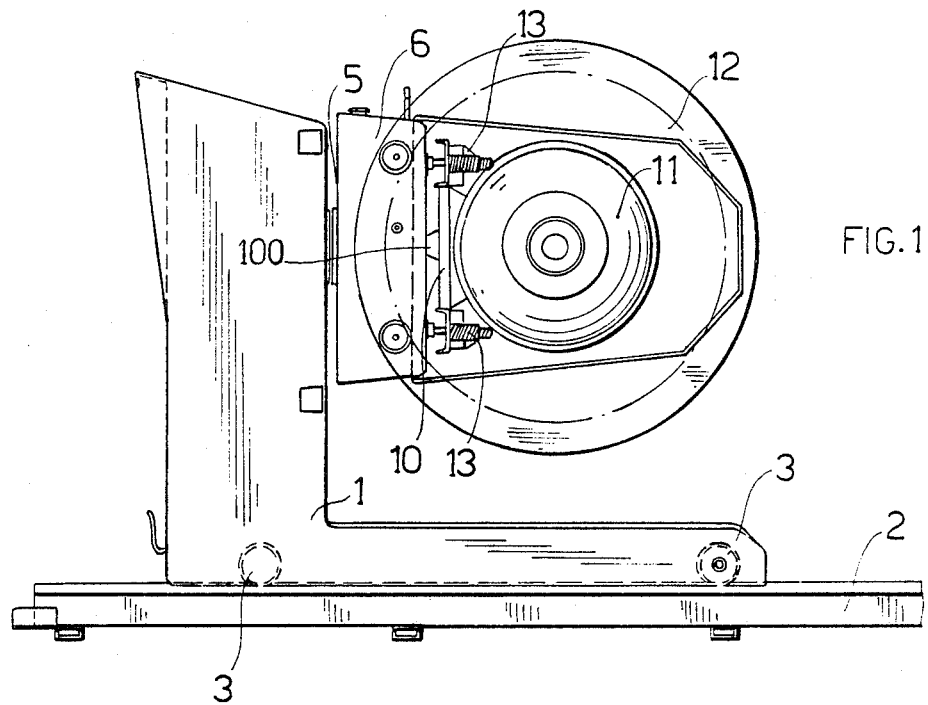
FIG. 1 shows the side view of a machine according to the invention.
Figure 2:
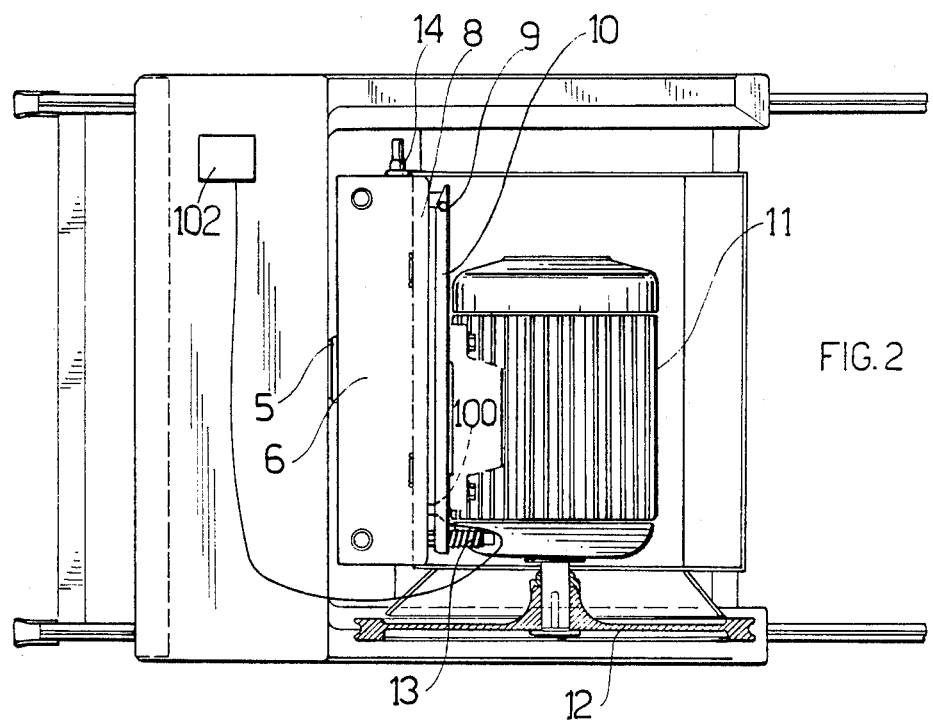
FIG. 2 shows the view of FIG. 1 from above.

The machine according to the invention includes a frame 1 that can slide along tracks 2 by means of wheels 3 driven, through gear motors of a known type, by an electric motor 4 placed inside the machine.

On frame 1 there is also mounted, by means of a support 5 rotating around a horizontal axis, a structure 6 along which a plate 8 can slide, on tracks or the like; to said plate a second plate 10 is hinged at 9 forming a basis for connecting an electric motor 11 which drives pulley 12 dragging the diamond wire tool.

Base 10 can rotate around hinge 9 over a small stretch against a couple of helical springs 13 or the like. The shiftings of plate 8 along structure 6 are controlled by means of a threaded shaft 14, while an analogous worm gear 15 (FIG. 4) allows rotation of structure 6 around support 5, thus placing motor and pulley 12 according to the desired angle. Plate 10, while rotating, works on devices 100, 102, of a known type and therefore not described in detail, which detect, respectively, the tension of the wire 11a, via the rotation of base 10 about hinge 9 relative to plate 8 against springs 13, and the former as a function of the power absorbed by motor 11. These, when said power goes below a predetermined value, drive secondary motor 4 making the machine withdraw of a short stretch and then stop as soon as the power absorption returns to the designed level.

Substantially, therefore, the shiftings of the machine are controlled in function of the power absorption by motor 11, absorption that can vary within pre-determined narrow limits.

Any variation in the tension of the diamond wire tool determines a corresponding variation in the power absorption by the motor and this tension is determined in the course of construction, by calibrating springs 13 opportunely.

Substantially, when a new cut is started, the machine is made withdraw by stretching the wire, so as to cause a slight detachment of base or plate 10 from plate 8.

Thereby the diamond wire tool is given a tension in function of the elastic constant of springs 13.

As the cutting operation proceeds, the springs take plate 10 back to the initial position, keeping the tension constant in the wire.

When plate 10 arrives against plate 8 and the tension in the diamond wire tool shows sign of decreasing, the devices present in the machine detect the corresponding variation in the power absorption by motor 11 and control the driving of auxiliary motor 4 which makes the machine withdraw of a short stretch putting the diamond wire tool in tension again and causing rotation of basis 10 of the motor, so as to compress spring 13 again of some millimeters.

There follows an increase in the current absorption by motor 11, further to which the control devices switch off the working of secondary motor 4.

The presence of springs 13, besides, is useful for absorbing the layer that there can be in the diamond wire tool on starting of the motor.

All regulation and control devices can be contained, for instance, in a box 16 or the like, fastened to frame 1 as well.

The machine is finally completed by opportune protection devices such as a side plate 17 to protect the flywheel (FIG. 3) and an adjustable case 18, preferably of a telescopic type, as a protection of the diamond wire tool.

The working proceeds as follows: once tracks 2 are placed in front of the wall to be cut, the machine is positioned and, acting on the controls present in box 13, motor 4 is started making the machine withdraw until the diamond wire tool is given the necessary tension, which has been previously determined by calibrating springs 13 opportunely.

Worm gear 15 is then acted upon to rotate support 5 and give the pulley the exact inclination, then adjusting the positioning thereof by moving plate 8 along frame 6, by means of threaded shaft 14.

At this point motor 11 can be started, with plate 10 slightly detached from plate 8.

Springs 13 absorb the pull that the diamond wire tool undergoes on starting, after which they provide for keeping the tension thereof constant, until plate 10, further to the cutting operation, has come almost in touch with plate 8.

At this point the current absorption by motor 11 results to be minimum and the electronic devices that are present, on the basis of this detection, drive motor 4 making the entire machine withdraw of a small stretch. The work proceeds in this way until the cutting has been performed.

From the description given the advantages of the machine according to the invention are evident; the machine according to the invention is an extremely compact, flexible unit, that can work for a long while without need of any intervention by the operator, since all functions are performed automatically.

Obviously the sizes, as well as the materials used, can vary according to the use requirements.

What is claimed is:

1. A machine for cutting a block of stone in a quarry, comprising:
    a wire-driving motor and main pulley for driving a diamond wire cutting tool about the main pulley, whereby to cut stone;
    secondary motor means comprising a secondary motor for withdrawing the motor and main pulley away from a cut made by the driven diamond wire cutting tool;
    electronic device means for detecting the tension of the diamond wire cutting tool as a function of the power absorbed by the wire-driving motor and correspondingly controlling the secondary motor means, whereby to keep the tension of the diamond wire cutting tool constant, the electronic device means correspondingly controlling the secondary motor means stepwise;
    support means for supporting the motor and main pulley on the secondary motor means oscillably in response to the tension of the diamond wire cutting tool; and
    elastic means elastically operative between the support and secondary motor means upon relative oscillation therebetween for elastically keeping the tension of the diamond wire cutting tool constant between the steps of the electronic device means.

2. Machine according to claim 1, and further comprising moving means for moving the wire-driving motor and main pulley with respect to the support in a direction substantially parallel to the axis of the wire-driving motor.

3. The machine of claim 1, wherein the support means comprises a plate supporting the motor and main pulley rotatably relative to the secondary motor for the oscillatable response thereof and the electronic device means further comprises means detecting the rotation of the plate for controlling the stepwise control of the electronic device means.

4. Machine according to claim 3, wherein said plate supporting the motor is hinged in turn to a second support capable of rotating around a substantially horizontal axis.

* * * * *